United States Patent Office 3,763,300
Patented Oct. 2, 1973

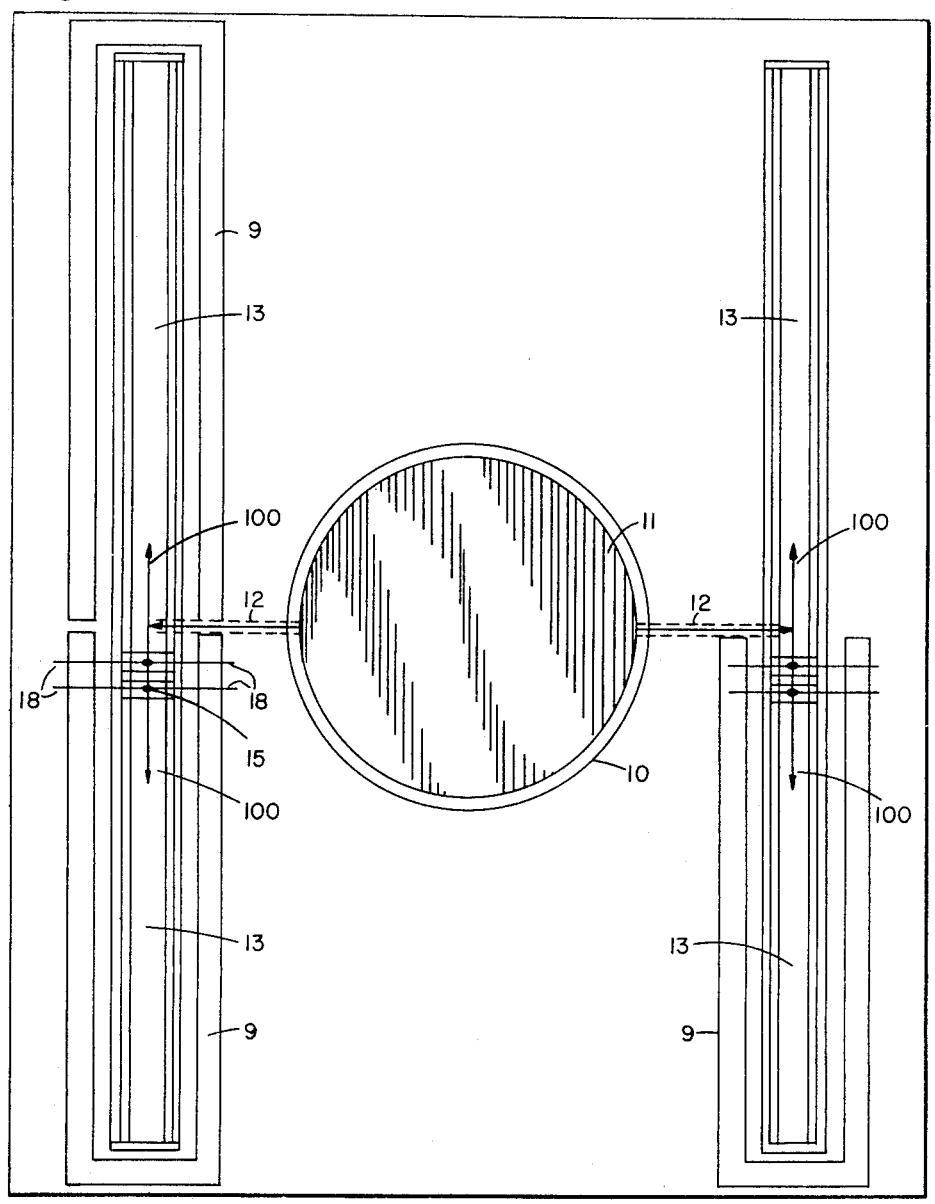

3,763,300
METHOD OF ENCAPSULATING ARTICLES
Keith Gordon Spanjer, Scottsdale, Ariz., assignor to Motorola, Inc., Franklin Park, Ill.
Original application Nov. 19, 1969, Ser. No. 878,104, now Patent No. 3,685,784. Divided and this application July 26, 1971, Ser. No. 166,259
Int. Cl. B29f 1/10
U.S. Cl. 264—272
2 Claims

ABSTRACT OF THE DISCLOSURE

A method of molding and a mold are provided for encapsulating devices such as axial lead cylindrical electrical devices in which two separable portions of the mold closely embrace the axial leads near the axial ends of the mold cavity and one of the mold portions includes piston-like parts, one for each molding cavity, which moves between at least two positions. In one position of a piston-like part of the mold, a mold cavity is open to receive encapsulating fluid and in the other position of the part the mold cavity is completely closed. In a modification, the piston-like parts are each shaped and positioned to form parts of adjacent molding cavities. The molding process involves supplying encapsulating fluid to the several cavities by applying pressure to the whole body of fluid and applying higher pressure to the fluid in each molding cavity.

BACKGROUND

Figure 1:
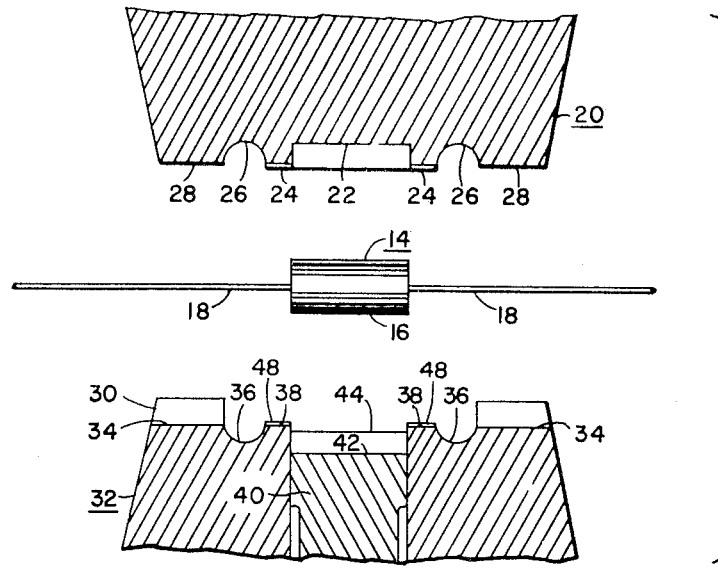

This is a division of application Ser. No. 878,104, filed Nov. 19, 1969, now Pat. No. 3,685,784.

In the prior art method of encapsulating a device, two mold portions are provided which, when put together in a proper manner, form a molding cavity. The article to be encapsulated is placed in the cavity and encapsulating fluid is fed under pressure into the cavity by way of the small passageway called a gate in either one of the portions of the mold or partly in both portions of the mold. A connecting tube or runner is provided connecting the central container for the molding fluid to the several gates. Since the gate area is small in comparison to the cross-sectional area of the cavity, the velocity of flow of encapsulating fluid is high, whereby the device to be encapsulated may be damaged by the flow. The fluid hardens and the mold parts are separated and the encapsulated item is taken out of the mold, usually by hand. The gate material as well as the material in the runner is wasted. Also, the gate material must be broken off the capsule leaving a rough spot that may interfere with labelling the capsule, especially if the capsule is small, whereby it may be necessary to smooth the surface of the article before it can be sold. Furthermore, if the capsule has axial leads, the encapsulating material may contact the leads for an undesirable distance along the length thereof, whereby the material must be cleaned off of the leads. Such cleaning and smoothing operations are difficult and expensive. In addition, in the prior art, since pressure is applied to the molding liquid at a distance from the mold cavity, the mold cavity may not be full, or, if full, all parts of the molding material may not have the same pressure applied thereto. Therefore, the molded articles as provided by the prior art method and mold may have differing densities in different portions thereof.

It is an object of this invention to provide an improved method of molding.

It is an object of this invention to provide an improved mold.

It is another object of this invention to provide a method of molding and a molding apparatus in which the amount of waste of molding material is minimized, the molding material is kept off the leads to the completed capsule, and closeable gate is provided, and the density of the molding material of the encapsulated package is uniform throughout the volume thereof.

SUMMARY

In accordance with the method of this invention, the encapsulating fluid is fed to molding cavities through large gates, which can be opened and closed, under centralized pressure, and as the gate is closed localized pressure is applied to the fluid in each cavity. When the fluid has hardened, the capsule is ejected from the cavity. Further in accordance with this invention, a mold is provided having an upper and a lower portion, which when fitted together provide a cavity of the shape of the finished encapsulated article or capsule. The lower portion includes at least one piston-like part for each cavity which is moveable with respect to the lower portion. When a piston is in one of its extreme positions, a passageway is provided along the length of the mold and between the mold portions to feed the cavities that are formed in the mold portions with encapsulating fluid. The passageway is so large that the flow of fluid into the cavities is slow, whereby the article to be encapsulated is not damaged by fluid flow. When the piston is in an intermediate position, the cavity takes the shape of the finished capsule and the feeding gate is cut off.

In the process of moving the piston to its intermediate position, the encapsulating fluid is compressed into the mold cavity, whereby the density of the capsule is made uniform. Since the feed gate is cut off when the piston arrives at its intermediate position, there is no gate material whereby waste of encapsulating material is reduced and the surface of the capsule is smooth. The fluid is fed from cavity to cavity along the length of the mold whereby the passageway for the fluid is shortened, further saving encapsulating fluid. If the capsule has leads, the upper and lower portions of the mold are tightly clamped on the leads at the ends of the cavity before the fluid is forced into the cavity, whereby no or very little encapsulating fluid comes into contact with the leads, whereby cleaning the leads is avoided. After the fluid is hardened, the piston is moved to its other extreme or to an ejecting position to eject the finished capsule.

DESCRIPTION

Figure 2:
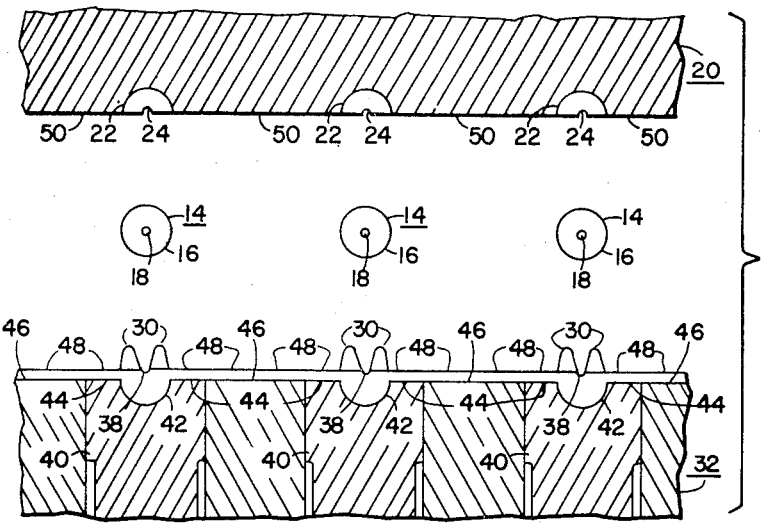
Figure 3:
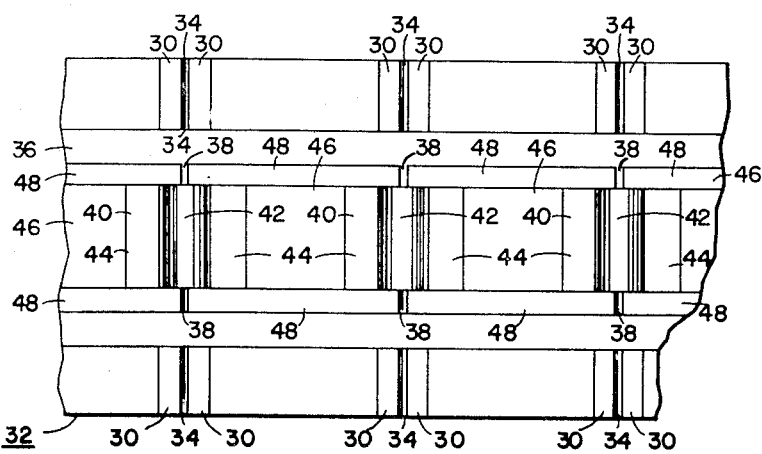

The invention will be better understood upon reading the following description in connection with the accompanying drawing in which:

FIG. 1 is an exploded vertical section of a mold according to this invention for providing a cylindrical capsule having axial leads and showing the relative position of the mold portions and the finished capsule, FIG. 2 is an exploded vertical section of the mold of FIG. 1 taken, however, at ninety degrees from the section of FIG. 1, and also showing the relative position of the mold portions to the finished capsule, FIG. 3 is a top view of the lower portion of the mold of FIGS. 1 and 2, FIGS. 4 and 5 are sectional views of the mold portions that are useful in explaining the inventive method and the operation of the mold of FIGS. 1–3, FIGS. 6 and 7 are, respectively, vertical section and a plan view of a modified mold of this invention, and FIG. 8 is a top view of a molding machine using the described molds and showing how the encapsulating fluid is fed to the mold cavity.

In general, in accordance with the prior art, encapsulating material is bought in a granular form; a certain amount thereof is weighed out and heated until it becomes a pliable mass which is called a pill. The pill is put into a reservoir such as reservoir 10 of FIG. 8. The articles 15 to be encapsulated are placed in the mold cavities in the lower half of the molds and the upper half of the molds is put over the article, and the two halves of the molds are fixed together. To assist in feeding the molding machine of FIG. 8, the supports 9 are loaded with articles 15, whereby a great many articles 15 may be placed in respective molding cavities of the lower half of the molds 13 at the same time. The pill is melted and the fluid is put under pressure of about 3000 pounds per square inch by piston means 11 contained in the reservoir 10. The fluid runs along passageways 12, 12 to the molds 13. Centralized pressure is applied by pressure means 11 in the central reservoir 10 to the liquid, and passageways, not shown in FIG. 8, are provided along the molds and individual gates are provided between the passageways and the individual cavities formed by the molds. As is shown in FIG. 8, four molds 13, each comprising a plurality such as 50 molding cavities, may be supplied with the articles 15 to be encapsulated and with encapsulation fluid at the same time, whereby about 200 encapsulated articles are made at one time. When it is judged that all the molds are full, the fluid is allowed to cool down and whatever material is left in the reservoir 10, called the cull, and the material in the passageway or runners 12 and in the passageways extending along the length of the individual molds and in the gates (not shown) are thrown away. The molds are taken apart to take out manually the finished articles that have the gate material attached thereto and the gate material is broken off and the articles are polished if necessary. If the article has leads, often the leads have molding material stuck thereto so far beyond the end of the capsule as to require cleaning the leads. Frequently, the cavities in the molds that are at an extreme distance from the reservoir 10 or those cavities to which the passageway or the gate holes has not been carefully cleaned out are not filled with encapsulating fluid, whereby the encapsulation of the article 15 is not perfect. The pressure in various parts of the mold is different, whereby the densities of the encapsulated articles are different from article to article and even along the length of the same article.

Molds of this invention that can be used in the molding apparatus of FIG. 8 and which do not have the disadvantages of known molds are shown in FIGS. 1 to 7. The molds of FIGS. 1 to 7 are provided particularly to encapsulate articles having axial leads. The articles 15 (shown in FIG. 8) to be encapsulated may include a central rectifying junction and coaxial leads 18. The finished articles 14, shown in FIGS. 1 and 2, have a cylindrical body portion 16 fully encapsulating the rectifying junction and axial leads 18 extending from the body portion 16.

First, considering FIGS. 1, 2, and 3, the upper portion 20 of a mold embodying the structural aspects of the invention and with which the method of this invention can be practiced has a semi-cylindrical cavity 22 which fits one-half of the circular surface and one-half of each end surface of the cylinder 16. The groove portions 24, 24 of the upper mold portion are adjacent the semi-cylindrical portion 22 thereof and fit the upper half of the leads 18 for a short portion of their length. Longitudinal grooves 26 are provided in the lower face of the mold portion 20 beyond the lead fitting grooves 24 to provide clearance for leakage of encapsulating fluid (if any) out of the cavity 22 along the leads 18. Portions 28 of the upper lead portion 20 and beyond the grooves 26 push the leads 18 down in the comb part 30 of the lower portion 32 of the mold as will be described.

The lower portion of the mold of FIGS. 1, 2, and 3 includes the outer comb part 30 having lower semi-cylindrical grooves 34 for receiving the lower part of the leads 18. Longitudinal grooves 36 which match with grooves 26 are next in the inwardly direction from the combs 30. Grooves 38 are provided to fit the lower part of the leads 18 adjacent the cavity for forming the cylindrical portion 16 of the article 14. As will be made more clear, when the upper portion 20 and the lower portion 32 abut each other, the portions 24 and 38 so closely fit the leads 18, 18 that fluid does not leak out, or very little fluid leaks out, along the leads 18, 18.

Figure 4:
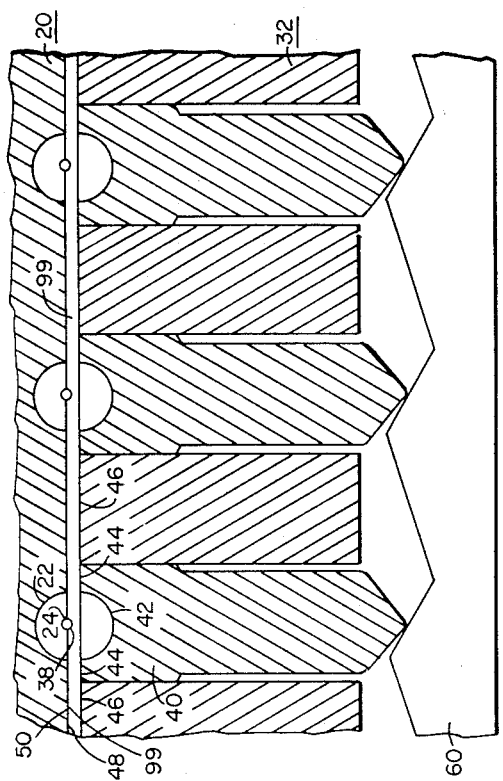
Figure 5:
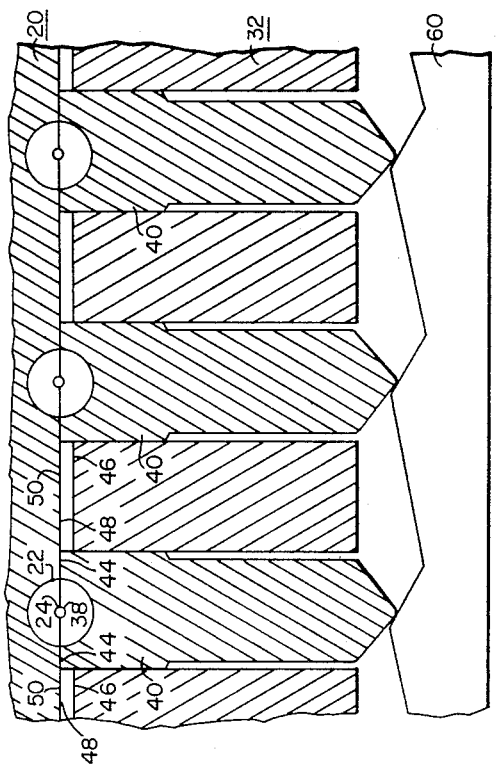

The bottom of the lower mold portion 32 is provided with a vertically moveable piston-like part or slider 40. The top of the piston 40, as shown in FIGS. 2 and 3, is centrally formed with a semi-cylindrical cavity 42 that fits the lower portion of the cylinder 16. The top of the piston 40, on both sides of the cavity 42, is flat, as shown at 44, FIG. 2. The center of the lower portion 32 of the mold between the sides of the piston 40 forms flat surfaces 46 which are below, by about twenty-thousandths of an inch, the upper or raised longitudinally-extending spaced parallel surfaces 48 which extend between the grooves on each side of the cavity 42. The piston 40 is moveable between its lowest position as shown in FIGS. 2 and 4 in which the surfaces 44 are flush with the surfaces 46 and its intermediate position shown in FIG. 5 in which the surfaces 44 are flush with the surfaces 48 and are in tight contact with the surface 50 of the upper mold portion 20. When the surface 44 is flush with the surface 46, and when the mold portions 20 and 32 are clamped together, leads such as the leads 18 are tightly clamped in semi-cylindrical grooves 24 and 38 which together closely embrace the leads 18, the surfaces 48 closely embrace the leads 18, and the surfaces 48 closely contact the corresponding portions of the surface 50 of the mold portion 20 between the cavities 22. However, there is a large space or passageway 99 (see FIG. 4) between the surface 46 and the corresponding portion of the surface 50 and also between the upper surface 44 and the corresponding portion of the surface 50 for flow of fluid from one end of the mold, comprising the two mold portions 20 and 32, to the other end thereof. This is shown in FIG. 4 in which the passageway 99 is provided along the whole length of the mold between the surface 50 and the cavity 22 of the upper mold portion 20 and the intermediate surface 46 of the bottom mold portion 32 and the upper surface 44 and upper cavity surface 42 of the pistons 44. However, the surface 48 of the lower portion 42, including the semi-cylindrical portions 38, and the surface 50 of the upper portion 20, including the semi-cylindrical portion 24, contact each other at each end of cavity portions 22 and 42 or they embrace the leads 18, whereby fluids can come in through the passageway 99 as described but cannot leak out. The passageway 99 is as wide as the cylindrical cavity 22 and 42 is long and is about twenty-thousandths of an inch deep. The area of the passageway is made large, about 20 percent of the cross-sectional area of the finished article 14, whereby flow of fluid into the several molding cavities is slower than if a small gate of the prior art were used.

In the use of the mold of this invention, the lower portion 32 of the mold with the pistons 40 in their lower position (and with the upper portion of the mold 20 out of the way) is loaded in a known manner with rectifiers 15 (for example) to be encapsulated. Then the upper portion 20 of the mold is properly placed on the lower portion 32 and these two portions 20 and 32 are clamped together in a known manner, the pistons 40 being in their lower position. Then encapsulating fluid from the reservoir 10 is fed to the passageway 99 of the completed mold, the fluid running in a direction of the arrows 100 in FIG. 8 into and through successive cavities. When, due to the pressure in the pot 10 as provided by the pressure providing means 11, all the cavities formed by the mold portions 20 and 32 are filled, the cam means 60 is moved in such a direction, to the right as viewed in FIGS. 4 and 5, as to raise all the pistons 40 simultaneously until they take the position shown in FIG. 5 in which the top surface 44 of each piston 40 is flush with and contacts the surface 50 of the upper mold portion 20. The passageway 99 is greatly reduced in length because several portions thereof are cut off between the several pistons 40. The semi-cylindrical surfaces 42 and 22 form cylindrical cavities which are concentric with the leads 18, 18 which are embraced by the semi-cylindrical grooves 24 and 38. While the cam 60 is pushing the sides 40 upwards, as viewed in FIG. 5, the fluid in the passageway 99 is compressed locally, that is, within each mold cavity comprising the semi-cylindrical portions 22 and 42 and to a higher pressure than the compression supplied by the central compression means 11 in the cylinder 10. This final higher compression insures that the molding cavities are filled and that the compression in each molding cavity is the same as that in other cavities and also that the compression in each cavity is the same throughout the length and width of the cavity, whereby the yield of properly produced encapsulated packages 14 is greater and the product is more uniform and of a higher quality than prior art molding machines using known molds. Furthermore, except for the cull, since only the liquid that remains in the runners 12 and the shortened passageway 99 between moving portions 40 is not used, less molding material is wasted than in prior art molding machines. Since there is no gate hole, the gate material is not wasted and the gate material need not be broken off the finished article and the surface at the break need not be made smooth. Also, since the portions at 24 and 38 tightly embrace the lead lines 18 throughout the filling, compressing, and hardening process, no fluid leaks out of the mold along the leads 18, whereby more fluid is saved and whereby the leads need not be cleaned. A greatly improved product, at a greater yield, results from the use of the disclosed molds 20 and 32.

When the top portion 20 of the mold is removed, further movement of the cam 60 to the right ejects the finished encapsulated articles, whereby the pistons 40 not only serve as the lower halves of molding cavities and as parts of open and closeable gates, but also as ejectors.

Figure 6:
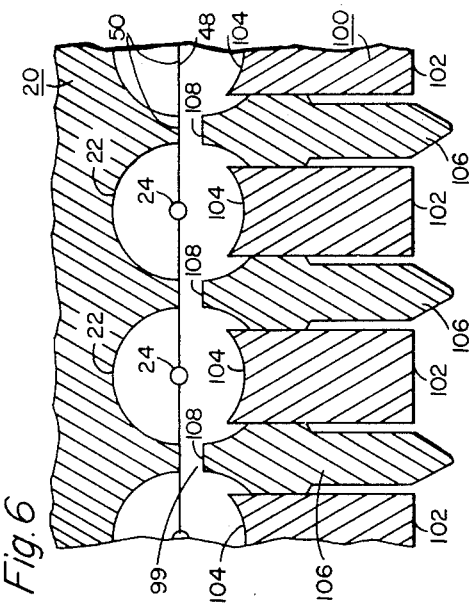
Figure 7:
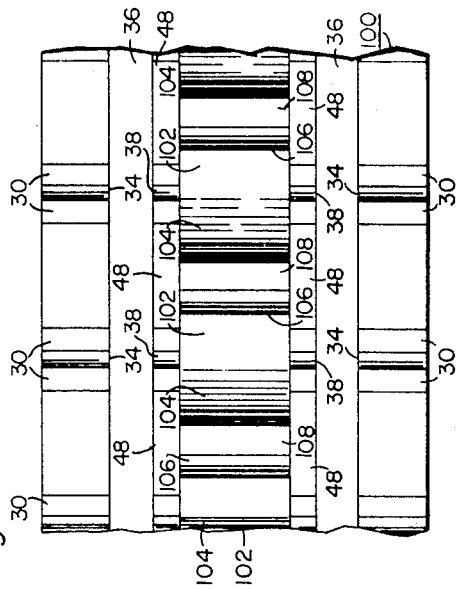

FIGS. 6 and 7 show another mold in accordance with this invention. In FIGS. 1–7, similar reference characters have been applied to similar parts. The upper mold portion 20 of FIGS. 1–5 and of FIGS. 6 and 7 are similar. The lower mold portion 100 differs in a manner to be explained.

As shown in FIG. 7, the lower mold portion includes the combs 30, the longitudinal grooves 36, the lead embracing grooves 38, and the raised flat parallelly extending surfaces 48 which abut the surface 50 of the upper mold portion longitudinally and at each side of the cavities that are formed by the upper cavity portions 22 and the lower cavity portions, to be described.

The lower mold portion 100 is formed with fixed bridge portions 102 that are in central registry with the cavity portions 22 when the mold portions 20 and 100 are properly assembled. The tops of the fixed portions 102 have partly cylindrical cavities 104 formed therein, the cavities 104 forming part of the same cylindrical cavity that fits the cylindrical portion 16 of article 14 of FIG. 1. A piston 106 is provided between each two fixed portions 102. The top 108 of the pistons 106 is flat and when the pistons 102 are in their intermediate positions, the flat portions 108 tightly fit against the surface 50 of the upper mold portions 20. At each side of the top portions 108, the pistons 106 are shaped so that in the intermediate positions of the pistons 106 they, with the cavity portions 22 and 104, form a cylindrical cavity of the shape of the cylindrical portions 16 of the finished article 14. In the lowest positions of the pistons 106 as shown in FIG. 6, a large passageway 99 is provided for fluid flow along the length of the mold comprising the mold portions 20 and 100 into a first molding cavity, then into a second, and so on to the last cavity. In the top position of the pistons 106, the finished article is ejected from the open mold. This mold of FIGS. 6 and 7 has all the advantages of the mold of FIGS. 1–5. In addition, in the mold of FIGS. 6 and 7, many more cavities may be provided along the length of the mold due to the fact that each piston 106 becomes part of two adjacent cavities whereby the gate distance, the width (as shown in FIGS. 6 and 7) of the flat portion 108, is greatly reduced over the gate distance of FIGS. 4 and 5. The pistons 106 are moved up by a cam means such as cam 60 of FIGS. 4 and 5.

Each time an article is molded by the molds of FIGS. 1–7, the molding fluid is fed into and through the successive molding cavities, whereby the length of passageways for the fluid is minimized, under pressure through wide open gates, whereby the flow of fluid is slow causing no damage to the device to be encapsulated. Then higher pressure is applied to the fluid in the cavities as the pistons 40 in FIGS. 1–5 and 106 of FIGS. 6 and 7 are raised to their intermediate positions and simultaneously the gates are closed, whereby the passageway is made still shorter and whereby no gate material need be broken off the molded article and whereby the density of the molded article is increased and is made uniform from article to article and from one portion to another portion of the molded article. Then, after the fluid has hardened and the upper portion 20 of the mold is removed, the pistons 40 and 106 are raised still further, whereby the finished articles are ejected.

If desired, an article without leads may be molded. In such case, the surfaces 48 and 50 will be extended flat without grooves 38 and 24 therein; however, the complementary cavities, which may be given any shape desired, will be retained. Otherwise, no change will be made in the described molds of the several figures.

What is claimed is:

1. The method of encapsulating articles which may be damaged by high velocity flow utilizing a plurality of molding cavities formed by molds having upper and lower mold portions, at least one of each said mold portions being comprised of a first part and a second piston-like part movable relative to said first part thereof, comprising;

placing said articles in the molding cavities;
    filling the molding cavities with a molding fluid by feeding said molding fluid into one molding cavity and through said one molding cavity into another molding cavity; moving said second piston-like mold parts to decrease the size of said cavities and increase the pressure therein while completely separating said cavities; and
    allowing said molding fluid to harden.

2. The method of claim 1 wherein said step of filling said cavities is accomplished by feeding the molding fluid into said cavities through a gate and moving said gate to completely enclose said cavities while simultaneously closing off the molding fluid feed.

References Cited
UNITED STATES PATENTS

| | | | |
|---|---|---|---|
| 3,270,115 | 8/1966 | Novel | 264—328 |
| 3,028,284 | 4/1962 | Reeves | 264—328 |
| 3,608,004 | 9/1971 | Borisuck | 264—244 |
| 3,219,743 | 11/1965 | Berler | 264—328 |
| 3,392,072 | 7/1968 | Gropp | 264—160 |
| 1,318,700 | 10/1919 | Skolnick | 264—323 |

ROBERT F. WHITE, Primary Examiner

T. E. BALHOFF, Assistant Examiner

U.S. Cl. X.R.

264—275, 297